April 30, 1929.  L. D. SOUBIER  1,710,789
GLASS APPARATUS
Filed June 10, 1926   3 Sheets-Sheet 1
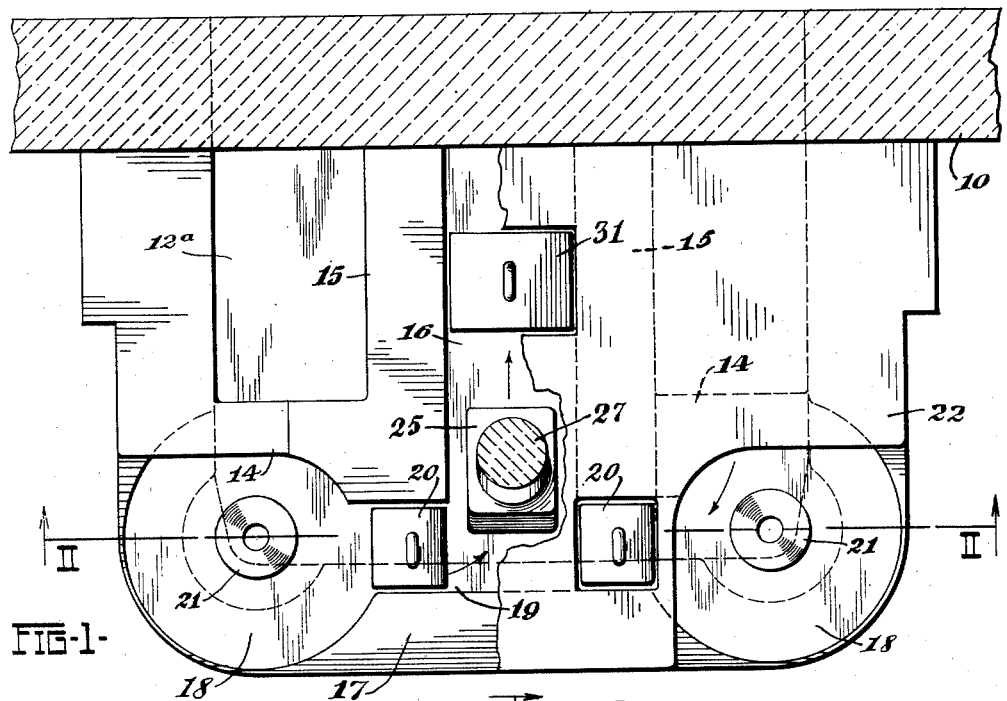
FIG-1-
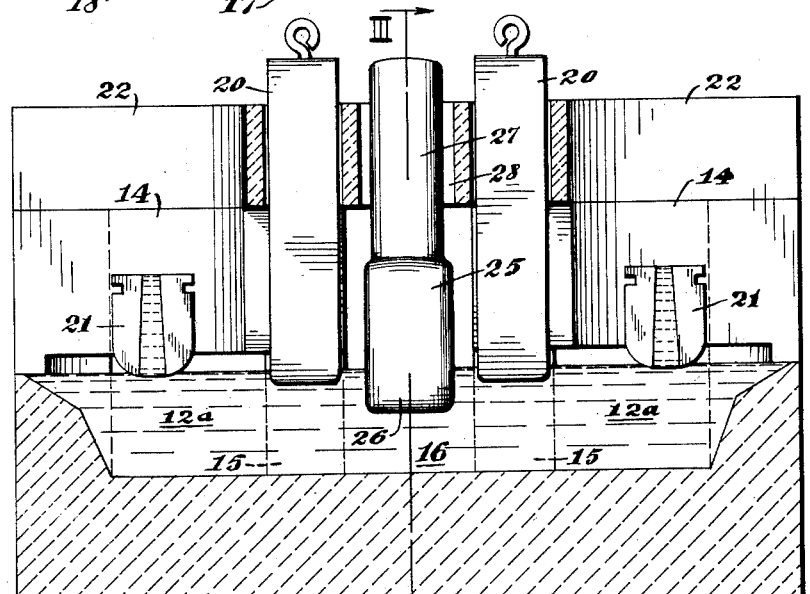
FIG-2-
INVENTOR
Leonard D. Soubier
By J. F. Rule.
His attorney.

April 30, 1929.  L. D. SOUBIER  1,710,789
GLASS APPARATUS
Filed June 10, 1926   3 Sheets-Sheet 2
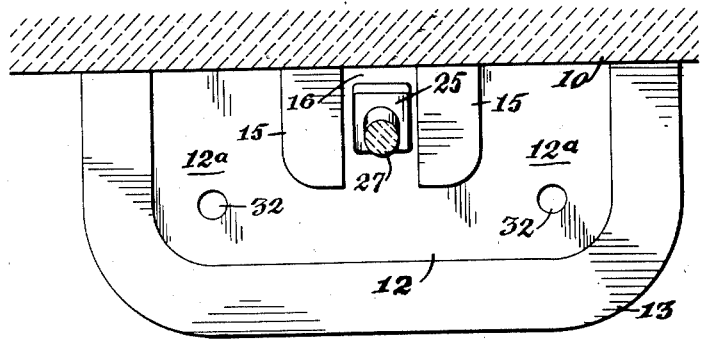
FIG-4-
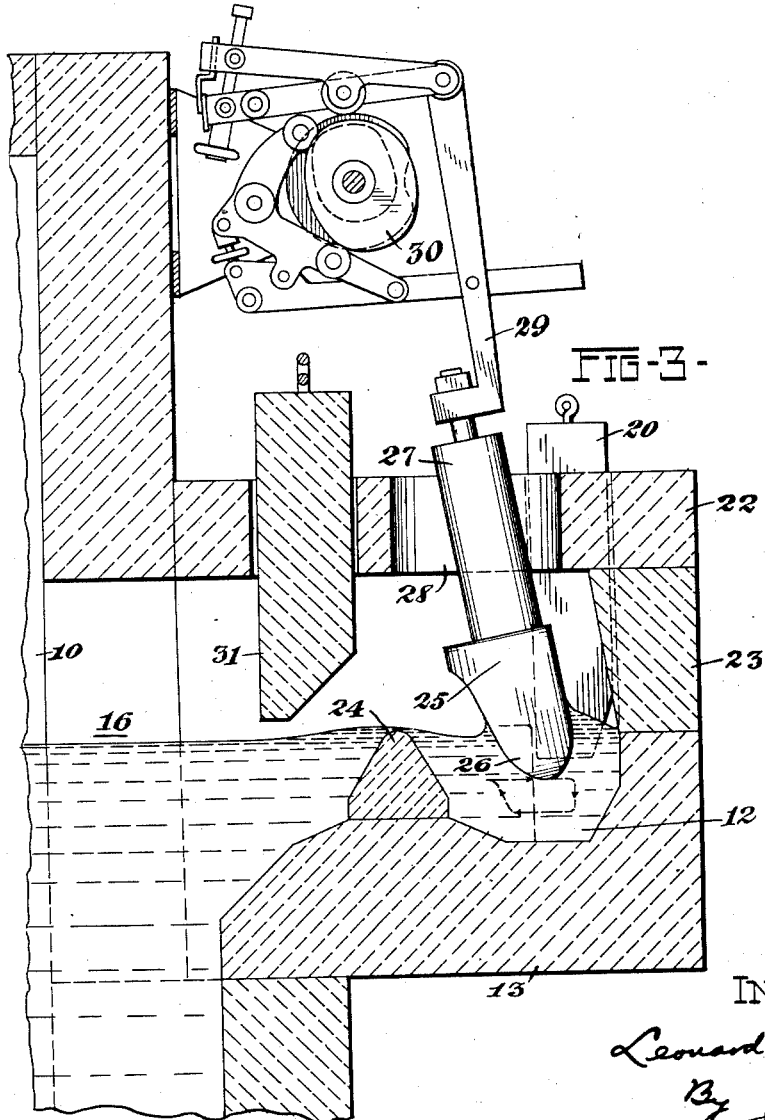
FIG-3-
INVENTOR
Leonard D. Soubier
By J. F. Rule.
His attorney.

April 30, 1929.  L. D. SOUBIER  1,710,789
GLASS APPARATUS
Filed June 10, 1926   3 Sheets-Sheet 3
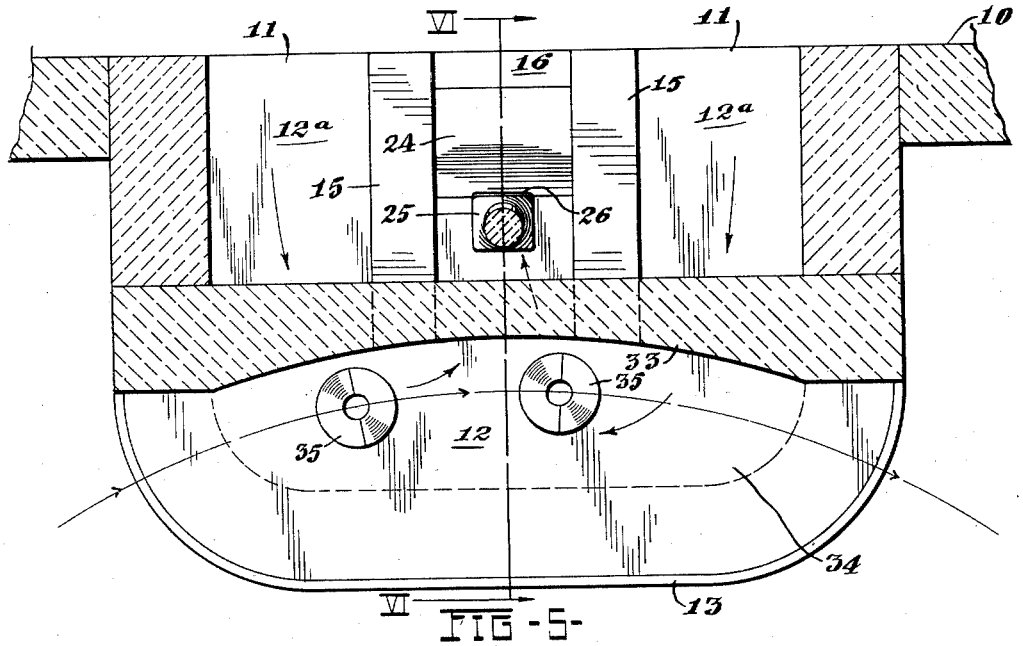
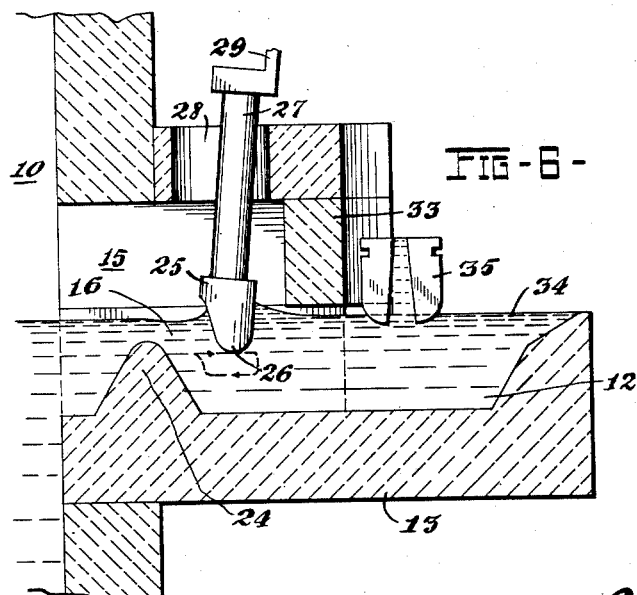
INVENTOR
Leonard D. Soubier
By J. F. Rule,
His attorney.

Patented Apr. 30, 1929.

1,710,789

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS APPARATUS.

Application filed June 10, 1926. Serial No. 115,026.

My invention relates to improvements in means for feeding molten glass from a main tank or furnace to a receptacle from which charges of glass are transferred to the molds of a forming machine.

An object of the present invention is to provide means for continuously flowing molten glass to several gathering areas of a receptacle, from which areas charges of glass are periodically gathered, as for example, by suction gathering molds of a forming machine, or machines, said gathering areas receiving their supplies of glass from separate outlets in a supply tank and communicating with each other and the tank so that ungathered portions are returned through a common passageway to said tank for reheating.

Another object is to provide means whereby molten glass in a very hot and desirable working condition may be supplied from a refining tank to several points from which charges are transferred to molds, such means causing a continuous circulation of the glass past the transfer points and effecting positive return of untransferred portions to the refining tank for reheating.

Other objects of the invention will be in part obvious and in part pointed out hereinafter.

In the accompanying drawings forming a part of this application:

Fig. 1 is a plan view, partly in section, of an apparatus embodying one form of my invention and illustrates the extension arrangement where a plurality of charges are simultaneously gathered and transferred to a stationary forming machine.

Fig. 2 is a sectional view taken substantially on the line II—II of Fig. 1.

Fig. 3 is a vertical sectional view taken substantially on line III—III of Fig. 2 and showing the mechanical means for periodically returning portions of ungathered glass to the refining tank and thereby causing continuous movement of glass past the gathering point or points.

Fig. 4 illustrates the application of my invention to a gravity feeder.

Fig. 5 is a plan view, partly in section, showing an extension formation adapted for use with a machine having a continuously rotating mold carriage; and Fig. 6 is a sectional view taken substantially on the line VI—VI of Fig. 5 and showing the mechanical means for maintaining glass circulation.

Referring to the drawings, the main tank or furnace 10 from which molten glass is supplied, is provided with a forehearth or extension 13 projecting outwardly from the front wall of the furnace. This forehearth is formed with a substantially U-shaped channel 12, comprising a main channel portion substantially parallel with the front wall of the furnace and end portions 12$^a$ communicating with the tank 10 through spaced openings 11 in the furnace wall, through which openings the glass flows from the tank into said channel portions 12$^a$. At the front ends of the channel portions 12$^a$, there are provided transverse jack-arches 14, whose lower ends terminate in proximity to the surface of glass flowing through the channel, such spaced termination being for the purpose of preventing escape of an undue amount of heat from the refining tank while permitting circulation of heated gases over the glass in the channels to maintain the required temperature of the glass, particularly at the gathering points. The inner longitudinal walls 15 of the lateral branch channels are spaced apart to form therebetween a return passageway or channel 16 providing communication between an intermediate and substantially central portion of the main channel 12 and the refining tank 10. The front portion 17 of the extension is thickened between the gathering areas 18, and as will be noted by reference to Fig. 1, this thickened portion is directly opposite and rather closely associated with the outer ends of the inner walls 15, thereby forming narrow channels 19 providing communication between the gathering areas 18 and the entrance to the return passageway 16.

In order that chilled surface portions of glass in the gathering areas 18 will be compelled to move below the surface and mix with other hotter portions of glass during circulation, a pair of valve gates 20 are arranged as shown in Figs. 1 and 2 wherein it will be noted said valve gates are disposed in the narrow channels 19 between the outer ends of the transverse walls 15 and said thickened portion 17 of the extension. Because of vertical adjustability of these valve gates, it is evident that the lower ends may be projected any desired distance into the body of glass and cause movement of chilled portions below the surface to any desired degree.

Gathering molds 21 of a stationary forming machine (not shown) are adapted to be periodically oscillated or moved to the positions shown in Figs. 1 and 2 for the purpose of receiving charges of glass from the gathering areas 18 through and past which fresh hot glass is continuously moved from the lateral branches 12ᵃ of the main channel 12. A cover block 22 is arranged over the extension and has its front corner portions cut away as shown in Fig. 1 for the purpose of exposing the gathering areas 18 and permitting downward swinging of the gathering molds 21 to the positions shown in Fig. 2. The forward intermediate portion of this cover block 22 is supported in spaced relation to the thickened portion 17 of the extension by a block 23 as shown in Fig. 3.

It is highly desirable that the glass at the gathering areas 18 be at all times in the best possible working condition, by reason of which a positive circulation of glass through the channel 12 and adjacent portions of the refining tank 10 is essential. Consequently, a mechanical device is arranged in the return passageway or channel 16 and is in continuous operation for the purpose of forcing ungathered portions of glass back into the refining tank 10 for reheating, and consequently causing a flow of fresh glass from the tank directly to spaced gathering areas 18. This circulating means includes the formation of an upstanding obstruction or dam 24 which extends transversely of the inner end of said return passageway 16 and rises to a point substantially at the normal level of glass within the refining tank and channel.

Arranged outwardly of said obstruction 24 is an impeller 25 whose lower end 26 contacts with the molten glass in said return passageway 16. This impeller 25 has a portion 27 extending upwardly through an opening 28 in the extension cover block 23 and fastened to the lower end of a swinging arm 29, which is continuously moved by means of a cam and lever mechanism 30 corresponding to that shown in Fig. 14 of British Patent 142,786, granted the Hartford-Fairmont Company. Continuous operation of this mechanism 30 causes the lower end 26 of the impeller 25 to move in a closed path such as that indicated by the dot and dash lines in Fig. 3, it being noted in this connection that during the movement of the impeller 25 toward the obstruction, the lower end of the former is at its greatest depth in the glass, thereby pushing a portion of glass over the obstruction 24 into the refining tank 10 for reheating. Before the impeller 25 is moved in the reverse direction, it is lifted to such an elevation that the tendency to move the glass back into the main channel will be negligible. For the purpose of protecting the impeller (which incidentally is formed of refractory material), against heat which would be issued from the refining tank 10, and also to conserve the heat in the furnace, a transverse gate valve 31 is arranged inwardly of the upstanding obstruction and is adjustable toward and from the surface of the glass by any preferred mechanism (not shown).

Because of the continuous circulation of glass through the several channels, and the return of ungathered and chilled portions to the refining tank 10 by way of the intermediate or return passageway 16, wherein temperature is also quite high, it is evident that only a relatively slight degree of reheating of glass in the tank will be necessary. It will be noted that the glass is subjected to a slight chilling only at the gathering point or points, and since the portions coming in contact with the gathering molds and remaining with the body of glass in the extension are forced beneath the surface of the circulating glass by the valve gates 20, substantially the entire mass will be in condition at all times for gathering. Thus, it will be seen that because of the novel channel arrangement providing for continuous circulation of the glass and the particular association of these channels with the furnace interior and the means for effecting positive circulation, I have provided means whereby the molten glass is at all times very hot and in substantially perfect working condition at the points from which it is transferred to the forming machine.

In Fig. 4, the channel arrangement is illustrated in connection with a gravity feeder wherein the extension or boot is provided with a pair of longitudinally spaced submerged discharge orifices 32 disposed in substantially the same relation to associated parts as the gathering areas 18 in the form heretofore described. It is understood that in this form, glass is either periodically or continuously discharged through these discharge orifices 32 under influence of a flow regulating plunger (not shown) or other flow controlling means. Obviously, this channel arrangement is adaptable for use in connection with a gravity feeder as shown in Fig. 4, equally as well as with an extension from which glass is gathered by suction.

In Figs. 5 and 6, the extension is intended to provide for gathering charges of glass by molds 35 on a continuously rotating forming machine, and, as is apparent, a similar arrangement of lateral inlet channels 12ᵃ and intermediate glass return passageway 16 is utilized as was first described. The inlet openings 11 and the return passageway 16 have their outer ends restricted by a jack-arch 33 whose lower edge terminates in proximity to the surface of the glass in the channel 12 and at a point spaced inwardly from the front wall of the channel. This arrangement and the curvature of the front face of the jack-arch 33 on a line concentric with an arc described by the movement of a continuously rotating forming machine, provides an exposed gathering area 34 to and through which molten glass moves from the inlets 11 in opposite directions, and from the intermediate portions of which ungathered glass enters the return passageway 16 on its way to the refining tank 10 for reheating. Here again, the movement or circulation of glass is caused by a periodically actuated impeller 25 whose lower end 26 pushes portions of glass in the return passageway 16 over the dam 24 and back into the refining tank. In Fig. 5, a gathering mold 35 is shown at the left of the figure at substantially the point at which it first comes in contact with the molten glass, and at the right in a position wherein it is about to be lifted out of contact with the glass with its gathered charge. By reference to this figure, it will be noted that the gathering mold 35 moves to right and consequently in the direction of circulation of glass coming into the extension through the inlet opening 11 shown at the left of the figure. Upon reaching the transverse center of the main channel 12, incidentally defined by the cutting line for Fig. 6, the mold has gathered its charge and is about to be lifted out of contact with the glass. At this point, the gathering mold 35 reaches that portion of the glass entering the channel 12 by way of the inlet at the right in Figure 5, such glass moving in a direction opposite to the movement of the gathering mold. At substantially the period at which the mold reaches the portion of glass moving in a reverse direction to that of the glass from which the charge has been gathered, said mold 35 is lifted out of contact with the glass. The short period of contact of the moving gathering mold 35 and the oppositely flowing glass after the former has drawn in its charge, assists to a greater or lesser degree in clearing the lower end of the mold of strings of glass and quickly returns such chilled portions to the main body and back into the refining tank 10 for reheating. It is evident that the unbroken gathering area 34 in front of the jack-arch 33 could well be used in connection with a stationary machine wherein the gathering heads are oscillated and periodically brought into contact with the glass body in the same manner as set forth in connection with the illustrations in Figs. 1 to 3 inclusive.

Modifications of the invention may be made within the scope of the appended claims.

What I claim is:

1. The combination of a tank from which molten glass is supplied, a plurality of channels into which said tank opens, means for causing a movement of glass from the tank outward through said channels, and a return passageway common to all of said channels, through which glass from the channels is returned to the tank.

2. The combination of a tank to contain molten glass, channels extending from a wall of the tank, said wall having openings through which glass flows into said channels, an intermediate return channel communicating with said first mentioned channels, and glass propelling means operating in said return channel to propel glass therefrom into the tank and thereby cause a circulation of glass through said first mentioned channels.

3. A glass feeder comprising in combination a refining tank, a forward extension on the tank having a channel formed with inlets for glass at its opposite ends communicating with the interior of said tank, means permitting transfer of charges of glass from the channel to a forming mold, and a passageway between the inlets interconnecting the channel and said tank and permitting return of ungathered glass from the channel to the refining tank.

4. In a glass feeder, the combination of a refining tank, a forward extension on said tank having a channel formed with inlets at its opposite ends communicating with the interior of said tank, means permitting transfer of charges of glass from said channel to a forming mold, a passageway arranged between said inlets and forming communication between intermediate portions of the channel and said tank, and mechanical means for causing portions of the ungathered mass to return to the refining tank through said passageway.

5. In a glass feeder, the combination of a refining tank, a forward extension on said tank having a channel formed with inlets at its opposite ends communicating with the interior of said tank, a passageway forming communication between intermediate portions of the channel and the interior of said tank, an obstruction arranged transversely of said passageway and rising from the floor of the latter, mechanical means for periodically moving portions of glass over said obstruction and into the tank, and means permitting transfer of charges of glass from said channel to a mold.

6. The combination of a tank to contain molten glass, a channel having its ends terminating in the tank and permitting inflow of glass to the channel through both ends, means permitting transfer of charges of glass from said channel to a mold, and means for returning ungathered portions of the glass to the tank from an intermediate portion of said channel, said return means comprising a passageway and an oscillating paddle therein.

7. The combination of a tank to contain molten glass, a channel having its ends terminating in the tank and permitting inflow of glass to the channel through both ends, means permitting transfer of charges of glass from the channel to a forming machine, a return passageway forming communication between an intermediate portion of the channel and the interior of said tank, and means contacting with glass in said return passageway to cause continuous circulation of glass through the channel, passageway, and tank.

8. The combination of a tank to contain molten glass, a channel having its ends within the main body of the tank permitting inflow of glass to the channel through both ends, means permitting transfer of charges of glass from the channel to a mold, a return passageway forming communication between an intermediate portion of the channel and the interior of said tank, an obstruction rising from the floor of said return passageway and terminating substantially at the normal level of glass in the passageway, and means contacting with the glass in the passageway for causing movement of glass over said obstruction and creating circulation of glass through the channel, passageway, and refining tank.

9. The combination of a tank to contain molten glass, a channel having its ends within the main body of the tank permitting inflow of glass to the channel through both ends, means permitting transfer of charges of glass from the channel to a mold, a return passageway forming communication between an intermediate portion of the channel and the interior of said tank, an obstruction rising from the floor of said return passageway and terminating substantially at the normal level of glass in the passageway, and means contacting with the glass in the passageway for causing movement of glass over said obstruction and creating circulation of glass through the channel, passageway, and refining tank, said circulating means comprising an oscillating paddle projecting into the glass outwardly of said obstruction.

10. The combination of a tank to contain molten glass, a channel having its ends terminating at spaced points below the level of the glass in the tank and permitting inflow of glass to the channel through said ends, means permitting transfer of charges of glass from the channel to a mold, a return channel forming communication between an intermediate portion of the first named channel and the interior of the tank and arranged below the level of the glass in said tank, a transversely extending dam arranged in said return channel and terminating at substantially the normal glass level, and mechanical means arranged to periodically push portions of glass in said return channel over the dam into said tank to maintain circulation of glass in the channels and tank.

11. The combination of a tank to contain molten glass, a channel having its ends terminating at spaced points below the level of the glass in the tank and permitting inflow of glass to the channel through said ends, means permitting transfer of charges of glass from the channel to a mold, a return channel forming communication between an intermediate portion of the first named channel and the interior of the tank and arranged below the level of the glass in said tank, a transversely extending dam arranged in said return channel and terminating at substantially the normal glass level, mechanical means arranged to periodically push portions of glass in said return channel over the dam into said tank to maintain circulation of glass in the channels and tank, said mechanical means including an impeller having a portion projecting into the glass outwardly of the dam, and means for periodically moving said portion toward and from the dam and increasing the degree of projection into the glass substantially at the beginning of the movement toward the dam.

12. The combination of a tank to contain molten glass, a channel having laterally directed ends terminating in the tank and permitting inflow of glass to the channel through both ends, a return channel forming communication between an intermediate portion of the first named channel and the interior of said tank, means in said return channel for positively moving glass from said channels into the tank, and a cover for said channels, said cover having a portion cut away to expose a gathering area.

13. The combination of a tank to contain molten glass, a channel having its ends directed laterally and terminating in the tank to permit inflow of glass to the channel from two spaced points, a return passageway forming communication between an intermediate portion of the channel and said tank, means in said passageway for positively returning portions of glass in the channels to said tank, and a cover for said channels having portions cut away to expose charge gathering areas at the junctures of the main portion of said channel and its laterally directed ends.

14. The combination of a tank to contain molten glass, a channel having its ends directed laterally and terminating in said tank to permit an inflow of glass to the channel through both ends, a cover arranged over said channel and having portions cut away over said channel to expose gathering areas at the juncture of the laterally directed and main portions of the channel, and means disposed between the laterally directed portions for returning ungathered portions of glass from substantially the center of said channel to the refining tank.

15. A glass feeder including a main channel, laterally directed end channels to permit inflow of glass through the ends of the main channel, means permitting transfer of charges from the main channel to a forming machine, and a return passageway between the lateral channels permitting movement of glass outwardly from an intermediate portion of said main channel.

16. In a glass feeder, a body having a main channel, laterally extending channels communicating with the ends of the main channel to permit inflow of glass to both ends of the latter, means permitting transfer of charges of glass from the main channel to a forming machine, a return channel between the lateral channels permitting outflow of glass from an intermediate portion of the main channel, and mechanical means in the return channel causing outflow of glass therethrough from said channel.

17. In a glass feeder, a body having a main channel, laterally extending channels communicating with the ends of the main channel to permit inflow of glass to both ends of the latter, means permitting transfer of charges of glass from the main channel to a forming machine, a return channel between the lateral channels permitting outflow of glass from an intermediate portion of the main channel, and means for effecting positive circulation of glass into the main channel and out through the return channel.

18. In a glass feeder, a body having a main channel, laterally extending channels communicating with the ends of the main channel to permit inflow of glass to both ends of the latter, means permitting transfer of charges of glass from the main channel to a mold, a return channel between the lateral channels permitting outflow of glass from an intermediate portion of the main channel, a dam extending across the return channel and rising from the floor to substantially the normal glass level, and mechanical means arranged adjacent said dam to periodically move portions of molten glass out of the main channel and over said dam.

19. In a glass feeder, a body having a main channel, laterally extending channels communicating with the ends of the main channel and forming inlets for glass, a return passageway permitting outflow of glass from an intermediate portion of said main channel, a cover having portions cut away to expose gathering areas at the juncture of the main and lateral channels, and means causing movement of chilled portions of ungathered glass below the surface in passing from the gathering areas to said return channel.

20. In a glass feeder, a body having a main channel, laterally extending channels communicating with the ends of the main channel and forming inlets for glass, a return passageway permitting outflow of glass from an intermediate portion of said main channel, a cover having portions cut away to expose gathering areas at the juncture of the main and lateral channels, means causing movement of chilled portions of ungathered glass below the surface in passing from the gathering areas to said return channel, and means in said return channel for periodically causing outflow from the main channel.

21. The combination of a furnace tank for molten glass, a plurality of channels communicating therewith, a return passageway between said channels, and a single actuating device working in said return passageway and operable to produce an outward flow of glass from the tank through all of said channels and back to the tank through said return passageway.

Signed at Toledo, in the county of Lucas and State of Ohio, this 8th day of June, 1926.

LEONARD D. SOUBIER.